US012366215B1

(12) United States Patent
Otto

(10) Patent No.: US 12,366,215 B1
(45) Date of Patent: Jul. 22, 2025

(54) VARIABLE MODE ENGINE CONTROL

(71) Applicant: Paul Robert Otto, Birmingham, AL (US)

(72) Inventor: Paul Robert Otto, Birmingham, AL (US)

( * ) Notice: Subject to any disclaimer, the term of this patent is extended or adjusted under 35 U.S.C. 154(b) by 0 days.

(21) Appl. No.: 18/799,399

(22) Filed: Aug. 9, 2024

Related U.S. Application Data

(63) Continuation-in-part of application No. 18/357,245, filed on Jul. 24, 2023, now abandoned.

(60) Provisional application No. 63/397,533, filed on Aug. 12, 2022.

(51) Int. Cl.
*F02D 41/26* (2006.01)
*F02D 41/30* (2006.01)
*F02D 43/04* (2006.01)

(52) U.S. Cl.
CPC ............. *F02D 41/26* (2013.01); *F02D 41/30* (2013.01); *F02D 43/04* (2013.01)

(58) Field of Classification Search
CPC ........... F02D 41/26; F02D 41/30; F02D 43/04
See application file for complete search history.

(56) References Cited

U.S. PATENT DOCUMENTS 3,749,194 A * 7/1973 Bardwick, III .......... B60K 6/10 180/165
3,882,950 A * 5/1975 Strohlein ............... B60K 6/105 180/165
4,022,164 A * 5/1977 Fuchs ...................... F02B 75/12 123/339.14
4,405,031 A * 9/1983 Rotter .................... B60K 6/105 477/6
6,382,163 B1 * 5/2002 Murray .................. B60K 6/485 123/192.1
6,808,471 B1 * 10/2004 Bauerle ................... F02D 17/02 123/481
7,827,975 B1 * 11/2010 Gibson ............... F02N 11/0814 123/179.5

(Continued)

FOREIGN PATENT DOCUMENTS

CA 1115218 A * 12/1981 ............. B60K 6/105
CN 101307728 A * 11/2008 ........... F02D 41/064

(Continued)

*Primary Examiner* — Hung Q Nguyen
(74) *Attorney, Agent, or Firm* — The Gache Law Firm, P.C.; Russell C. Gache

(57) ABSTRACT

A method is disclosed to improve fuel efficiency in which detonations within an internal combustion engine are controlled to reduce fuel consumption. Nominal detonations occur when the engine main bearing shaft rotates and initiates combustion within cylinder surrounding the main bearing shaft at various predetermined angles. The current invention utilizes a starter motor to maintain a minimal rotation speed of the main engine flywheel and deactivates all cylinder detonations except occasionally a single or paired set of cylinders to provide intermittent supplemental maintenance power. Further, fuel injectors are deactivated to non-firing cylinders so that when intake valves are opened no fuel enters the cylinders. Exhaust valves are also kept open to further reduce cylinder resistance pressure, thereby creating a “free-wheeling” state of the engine pending renewed acceleration. Intermittently, a single cylinder may be activated to assist in maintaining a minimum flywheel RPM value.

11 Claims, 2 Drawing Sheets

(56) References Cited

U.S. PATENT DOCUMENTS

| | | | | |
|---|---|---|---|---|
| 8,770,164 | B2 * | 7/2014 | Van Druten | B60W 10/02 123/179.25 |
| 2002/0134596 | A1 * | 9/2002 | Morimoto | F02D 41/126 903/917 |
| 2005/0164828 | A1 * | 7/2005 | Polom | F02N 11/04 477/3 |
| 2008/0109150 | A1 * | 5/2008 | Pfohl | F02N 11/105 701/113 |
| 2009/0194056 | A1 * | 8/2009 | Hazelton | F02B 27/0247 123/184.57 |
| 2013/0204512 | A1 * | 8/2013 | Mizuno | F02N 11/084 701/112 |
| 2016/0115932 | A1 * | 4/2016 | Shafto | B60W 20/50 701/112 |
| 2017/0082050 | A1 * | 3/2017 | Lammers | F02D 31/008 |
| 2017/0328326 | A1 * | 11/2017 | Fujita | F02D 41/061 |
| 2019/0033170 | A1 * | 1/2019 | Dudar | G01M 15/106 |
| 2020/0164866 | A1 * | 5/2020 | Suh | B60W 10/06 |

FOREIGN PATENT DOCUMENTS

| | | | | | |
|---|---|---|---|---|---|
| CN | 102146848 | A | * | 8/2011 | F02D 31/001 |
| CN | 101285425 | B | * | 9/2015 | F02D 33/006 |
| DE | 2917139 | A | * | 11/1980 | B60K 6/105 |
| DE | 2748697 | C2 | * | 10/1985 | |
| DE | 19532164 | A1 | * | 3/1997 | B60K 28/16 |
| DE | 112011104635 | T5 | * | 10/2013 | F02D 41/04 |
| DE | 102012015010 | A1 | * | 1/2014 | F16D 48/06 |
| DE | 102008032935 | B4 | * | 6/2019 | F02D 35/023 |
| FR | 2563280 | A1 | * | 10/1985 | |
| FR | 3037910 | B1 | * | 6/2019 | F02N 11/04 |
| FR | 3079801 | A1 | * | 10/2019 | B60W 10/06 |
| GB | 2047816 | A | * | 12/1980 | B60K 6/105 |
| GB | 2116664 | A | * | 9/1983 | B60W 10/02 |
| GB | 2508028 | A | * | 5/2014 | F02N 11/0844 |
| JP | H0814074 | A | * | 1/1996 | |
| JP | 2502382 | B2 | * | 5/1996 | |
| JP | 2002070699 | A | * | 3/2002 | F02N 11/0844 |
| JP | 2012117413 | A | * | 6/2012 | |
| JP | 2013002333 | A | * | 1/2013 | F02N 11/0814 |
| KR | 20180071226 | A | * | 6/2018 | |
| NL | 7906521 | A | * | 3/1980 | B60K 6/105 |
| WO | WO-9108919 | A | * | 6/1991 | B60K 6/26 |
| WO | WO-2008064454 | A1 | * | 6/2008 | B60K 6/46 |
| WO | WO-2012053333 | A1 | * | 4/2012 | B60K 6/48 |
| WO | WO-2012168025 | A1 | * | 12/2012 | F16D 3/12 |
| WO | WO-2020119951 | A1 | * | 6/2020 | F02D 13/06 |

* cited by examiner

VARIABLE MODE ENGINE CONTROL

This application claims the benefit of filing priority under 35 U.S.C. § 119 and 37 C.F.R. § 1.78 of co-pending U.S. application Ser. No. 18/357,245 filed Jul. 24, 2023, for a VARIABLE MODE ENGINE CONTROL, and provisional application Ser. No. 63,397,533 filed Aug. 22, 2022 for a VARIABLE MODE ENGINE CONTROL. All information disclosed in those prior applications is incorporated herein by reference.

FIELD OF THE INVENTION

The present invention relates generally to internal combustion engines. It also relates to fuel control systems to improve internal combustion engine fuel efficiency. In particular, the present invention relates to engine control systems that vary engine operation to improve fuel efficiency.

BACKGROUND OF THE INVENTION

The operation of a typical four-stroke internal combustion engine is a complex process that involves a series of precisely timed events utilizing a series of combustion cylinders having internal compression pistons. The four-stroke cycle includes intake, compression, power, and exhaust strokes. During the intake stroke the piston moves downward in the cylinder, creating a vacuum that draws in a mixture of air and fuel through the intake valve. The intake valve then closes, sealing the cylinder. The compression stroke follows, with the piston moving upward and compressing the air-fuel mixture. This compression increases the temperature and pressure within the cylinder, preparing the mixture for ignition. A power stroke is then initiated by the spark plug, which ignites a compressed air-fuel mixture within each cylinder introduced through an arrangement of valves on the seated on and transcending into the interior of each cylinder. The resulting explosion forces the piston downward, generating power to turn the crankshaft. The energy produced during this stroke is what propels the engine flywheel and, through a transmission, the entire vehicle holding the engine. Finally, during the exhaust stroke, the piston moves upward again, pushing the spent combustion gases out of the cylinder through an open exhaust valve timed in relation to the flywheel position. The cycle then repeats.

Fuel efficiency in a four-stroke engine is optimized using common fuel injection technology. Fuel injection systems deliver the precise amount of fuel directly into the combustion chamber at the exact moment it's needed. This precision allows for better control over the air-fuel mixture, leading to more efficient combustion and improved fuel economy. There are two main types of common fuel injection systems: port fuel injection (PFI) and direct fuel injection (DFI). PFI systems inject fuel into the intake manifold, where it mixes with air before entering the combustion chamber. DFI systems, on the other hand, inject fuel directly into the combustion chamber. DFI systems are generally more efficient than PFI systems because they allow for a more precise control over the air-fuel mixture and can operate at a higher compression ratio.

Fuel injection systems also use sensors and electronic control units (ECUs) to monitor and adjust the air-fuel mixture in real-time using a variety of engine sensors. These components work together to ensure that the engine is operating at efficiently in a variety of driving conditions.

However, in a typical four-stroke internal combustion engine, fuel efficiency is often less than optimal due to a phenomenon known as back pressure. Back pressure refers to resistance or force opposing the desired flow of gases in the engine. This resistance can occur in various parts of the engine, but it is particularly impactful within the combustion cylinder.

During the exhaust stroke of the four-stroke cycle, the spent combustion gases are expelled from the cylinder through the exhaust valve and into the exhaust system. If there is resistance or back pressure in the exhaust system, it can impede the efficient expulsion of these gases. This means that some of the spent gases may remain in the cylinder as the next intake stroke begins. Moreover, during to the typical ignition timing, ignition occurs before reaching the top dead center (TDC) and by the time the crankshaft rotates to 90 degrees post-TDC, the pressure diminishes to roughly 300 psi, typically from 600 psi to 300 psi, caused by rapid cooling of the residual gases. This causes causing additional back pressure within the cylinder.

The presence of these residual gases can have several detrimental effects on fuel efficiency. First, they take up space in the cylinder that could otherwise be filled with a fresh air-fuel mixture, effectively reducing the engine's displacement and its potential for producing power. Second, these hot gases can cause the incoming air-fuel mixture to heat up and ignite prematurely, a phenomenon known as pre-ignition or knock. This not only reduces engine efficiency but can also cause damage over time.

Furthermore, back pressure can lead to increased pumping losses, as the engine has to expend more energy to expel the exhaust gases against the resistance. This energy expenditure detracts from the energy available for powering the vehicle, thus reducing fuel efficiency.

Modern internal combustion engines employ several strategies to mitigate back pressure and optimize fuel economy. These strategies primarily focus on improving the design and operation of the exhaust system, which is where most back pressure occurs.

For example, one common approach is to use exhaust gas recirculation (EGR). This strategy redirects a portion of the exhaust gases back into the engine's intake manifold. By diluting the incoming air-fuel mixture with these gases, the EGR system reduces the temperature of combustion, which in turn reduces the formation of nitrogen oxides, a major pollutant. However, the EGR system also has the effect of reducing back pressure, as less exhaust gas needs to be expelled from the cylinder during the exhaust stroke.

Another strategy is the use of turbochargers and superchargers. These devices use the energy in the exhaust gases to compress the incoming air-fuel mixture, increasing its density and thereby allowing more power to be extracted from each combustion cycle. The use of a turbocharger or supercharger can significantly reduce back pressure, as the exhaust gases are effectively "sucked" out of the cylinder by the turbocharger or supercharger.

The design of the exhaust manifold and exhaust pipe also plays a crucial role in mitigating back pressure. The exhaust manifold collects the exhaust gases from each cylinder and directs them into the exhaust pipe. The design of these components can greatly affect the flow of exhaust gases and thus the level of back pressure. Modern engines often use exhaust manifolds and pipes with smooth, curved surfaces to promote laminar flow and reduce turbulence, which can cause back pressure.

Finally, the use of high-flow catalytic converters and mufflers can also help reduce back pressure. Traditional catalytic converters and mufflers can restrict the flow of exhaust gases, creating back pressure. However, high-flow versions of these components are designed to minimize this restriction and thus reduce back pressure.

Engine designers use the above described strategies to mitigate the effects of back pressure, some degree of back pressure is inevitable in any real-world engine, and it remains a significant factor limiting the fuel efficiency of four-stroke internal combustion engines. However, these strategies focus on systems outside of the actual combustion cylinders and operate responsively to the actual act of detonation within the cylinder which limits their effectiveness.

Therefore, what is needed is an engine control system that controls the cylinder detonation of an internal combustion system to reduce fuel consumption while maintaining a satisfactory overall function of the engine.

SUMMARY OF THE INVENTION

A method is disclosed to increase fuel efficiency in which detonations within an internal combustion engine is controlled to improve fuel efficiency. Nominal detonations occur when the engine main bearing shaft rotates and initiates combustion within cylinder surrounding the main bearing shaft at various predetermined angles. The current invention utilizes a starter motor to maintain a minimal rotation speed of the main engine flywheel and deactivates all cylinder detonations except occasionally a single or paired set of cylinders to provide intermittent supplemental maintenance power. Further, fuel injectors are deactivated to non-firing cylinders so that when intake valves are opened no fuel enters the cylinders. Exhaust valves are also kept open to further reduce cylinder resistance pressure, thereby creating a "free-wheeling" state of the engine pending renewed acceleration. Intermittently, a single cylinder may be activated to assist in maintaining a minimum flywheel RPM value.

Other features and objects and advantages of the present invention will become apparent from a reading of the following description as well as a study of the appended drawings.

BRIEF DESCRIPTION OF THE DRAWINGS

A system incorporating the features of the invention is depicted in the attached drawings which form a portion of the disclosure and wherein.

DESCRIPTION OF THE PREFERRED EMBODIMENTS

Figure 1:
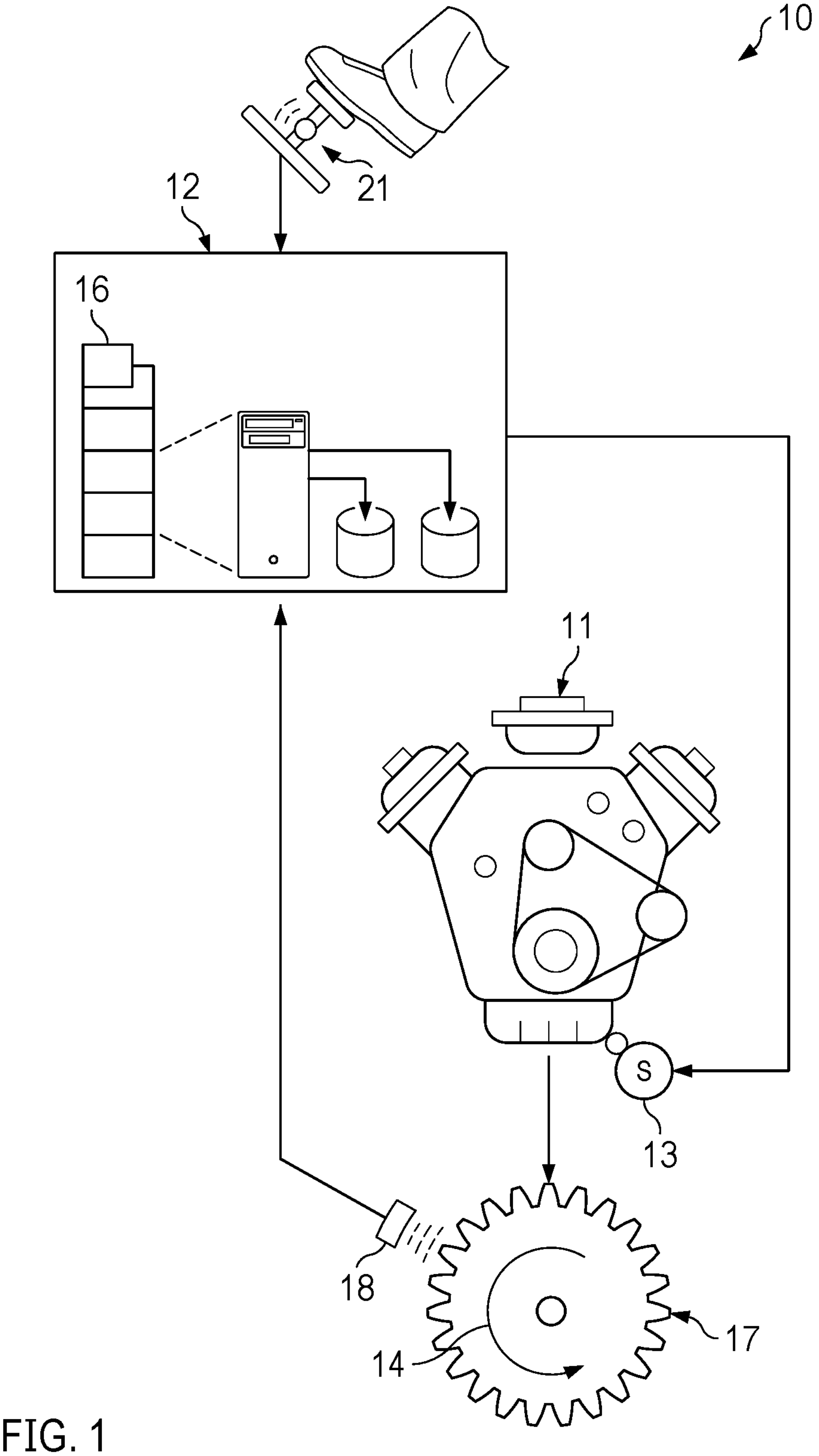
FIG. 1 is a diagrammatic view of the innovative engine control system showing the primary operating elements in the system; and, FIG. 2 is an operational flow diagram showing the major steps in the invention.

Referring to FIG. 1 for a better understanding of the function and structure of the invention 10, The operation of a typical four-stroke internal combustion engine 11 is controlled by a sophisticated computing system 12 such as an electronic control unit. This system manages everything from the initial activation of the starter motor 13 to the monitoring and adjustment of the engine's revolutions per minute (RPM).

The process begins when a software program 16 is activated to send power to the starter motor 13. This is the first step in starting the engine 11. The starter motor spins the engine's flywheel 17, setting the engine's internal components in motion and initiating the four-stroke cycle of engine 11.

Once the engine 11 is running, a sensor 18 on flywheel 17 sensor references an idle RPM value saved in memory, which sets the default RPM for the engine 11 when it is idling. This default idle RPM is monitored by the computing system 12 which adjusts the engine's operation as needed to maintain this referenced RPM.

To maintain the referenced minimum RPM, the computing system 12 activates at least one firing cylinder periodically. This action operates by opening a selected cylinder's intake valve (not shown) to allow a fresh air-fuel mixture to enter the activated cylinder, and then closes the valve in the designated cylinder and igniting the mixture to produce a power stroke. This process is repeated within the designated cylinder as needed to keep the engine running at the desired reference RPM.

The computing system 12 also monitors electrical input from the an accelerator pedal sensor 21. When the vehicle in which the system 10 is installed has a user depress the accelerator which is inclined to preset angle, a sensor is activated at that position (e.g. position 2) the system 10 raises the referenced RPM. This increases the engine's power output, allowing the vehicle to accelerate.

Figure 2:
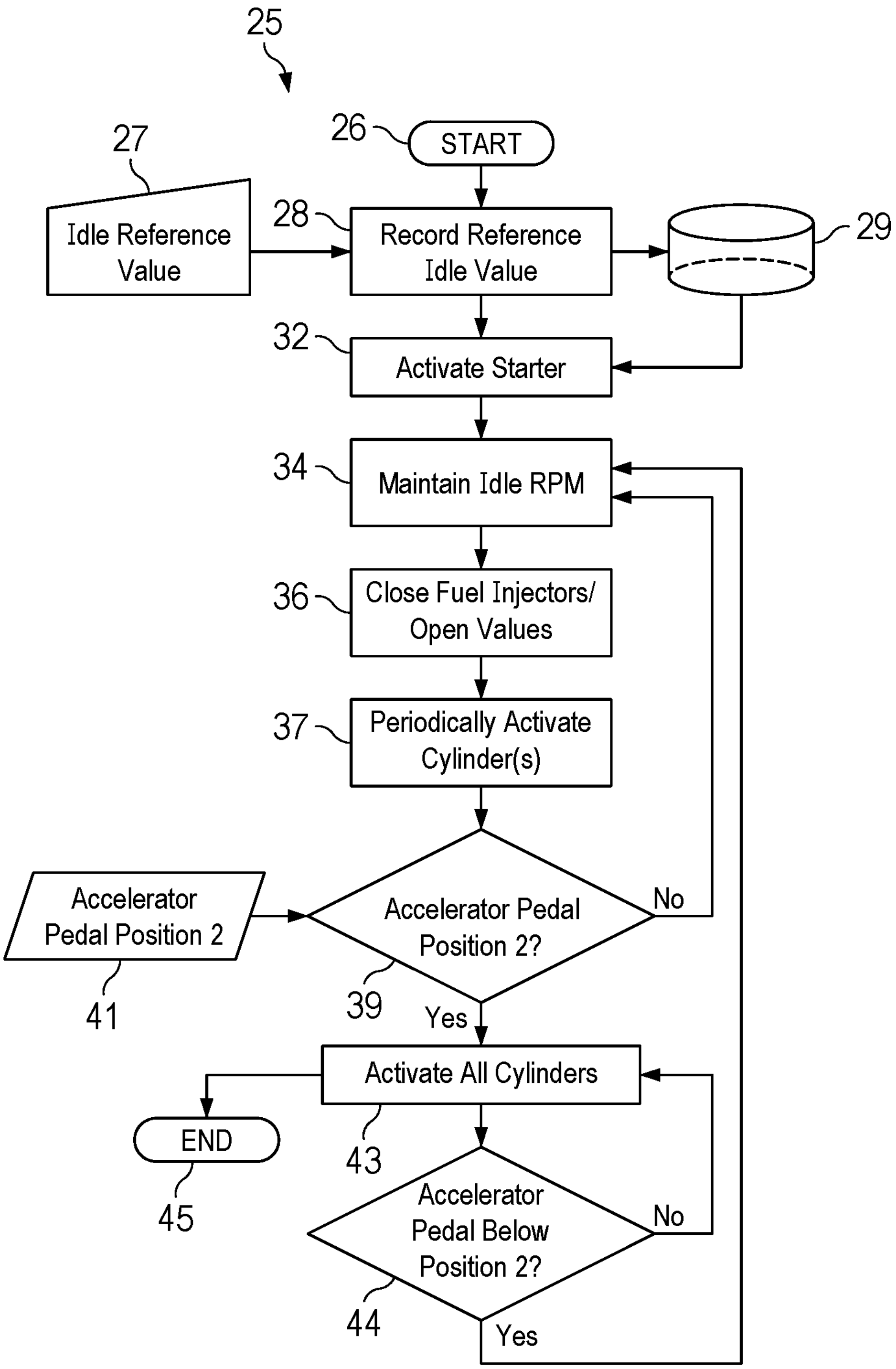

Referring to FIG. 2, the process steps may also be seen more clearly. Method 25 starts 26 with performing an idling setup step 27 in which the motor 11 idle value is established 28 and and recorded in memory 29. A start motor is activated 32 to engage a main bearing of the engine and to maintain a predetermined idle RPM in the engine as measured by flywheel sensor 18 (see FIG. 1), but based on recorded input from the recorded idle RPM 29. That "idle RPM state" is maintained 34 in which injector valves are closed in all cylinders 36 to prevent fuel flow in conjunction with periodic activation of a selected cylinder or cylinders 37 to assist in maintaining the idle RPM state 34.

Upon the user accelerator pedal being depressed 41 to a position two (2) at which time the computing system 12 (see FIG. 1) uses sensor data to occasionally activate a cylinder 37, as described earlier. This helps to maintain the engine's RPM above the referenced standard RPM, ensuring that the engine continues to produce the desired power output but does not consum fuel. Further cylinder port valves are opened to reduce backpressure building up within each cylinder. A paired cylinder (180 degrees separation from the first cylinder relative angle of the main bearing) is occasionally added to increase rpms and is based only on how rapidly the RPM decreases. A master control algorithm activates this paired 2nd cylinder only intermittently because engine RPM values vary little due to the fact that vehicle speeds are relatively constant a majority of the time.

The standard RPM resets 39 when position two (2) (step 44) of the accelerator pedal is achieved for at least 5 seconds. During this time, the computing system continues to monitor the engine's RPM and adjusts its operation as needed 43 to achieve standard acceleration, which constitutes a standard internal combustion operation or "full activation state" (i.e. nominal performance). This includes monitoring the pulses from the engine's sensors, which provides real-time data on the engine's operation. The computing system also works to maintain the RPM within the standard RPM range during the full activation state. This involves adjusting the engine's operation as needed, based on the data from the engine's sensors and the computing system's records.

When the standard RPM is turned off, the computing system switches the engine's operation method to the default idle RPM. This involves opening the engine's valves but not using any fuel, allowing the engine to idle without consuming unnecessary fuel. This is a "free-wheeling" or "idle RPM state" 42.

Finally, when the computing system and engine are turned off, the computing system no longer monitors the RPM data. This ends the engine's operation 45 until the next time the computing program is activated to start the engine.

While I have shown my invention in one form, it will be obvious to those skilled in the art that it is not so limited but is susceptible of various changes and modifications without departing from the spirit thereof.

Having set forth the nature of the invention, what is claimed is:

1. In an internal combustion engine system having a plurality of firing cylinders, each having fuel injectors and gas ingress and gas egress valves, a flywheel, a starter motor, and a main bearing, a variable mode engine control process, comprising the steps of:

a. recording an idle RPM reference value;

b. reading an accelerator pedal angle position by moving a sensor from a first position to a second position for a minimum of 5 seconds responsive to said pedal angle position;

c. reading an RPM value on said flywheel held within said internal combustion engine;

d. responsive to said steps of reading said flywheel RPM value and said accelerator pedal angle position, deactivating said fuel injectors and opening said cylinder valves;

e. responsive to said recorded RPM reference value, selectively activating the starter motor to drive said main bearing; and, f. in tandem with said step of selectively activating said start motor, selectively firing a selected one of said cylinders in response to said step of reading said accelerator pedal angle position in order to maintain said recorded reference idle value.

2. The process as recited in claim 1, further comprising the steps step of recording said main bearing angle position relative to said flywheel and selectively firing a pair of cylinders that are positioned 180 degrees apart from one another as referenced by said recorded main bearing angle position.

3. The process as recited in claim 2, wherein said step of reading said accelerator pedal angle position causes the step of firing all cylinders in said motor.

4. The process as recited in claim 3, wherein said step of reading an RPM value on said flywheel comprises the step of sensing movement of a magnetic sensor positioned on said flywheel.

5. The process as recited in claim 4, further including the step of sensing backpressure within at least one of said firing cylinders and opening said valves responsive thereof.

6. The process as recited in claim 5, wherein said process alternates between a state of maintaining an idle RPM value and activating all firing cylinders in order to efficiently run said internal combustion engine.

7. The process as recited in claim 1, wherein said step of reading said accelerator pedal angle position causes the step of firing all cylinders in said motor.

8. The process as recited in claim 1, further including the step of sensing backpressure within at least one of said firing cylinders and opening said valves responsive thereof.

9. The process as recited in claim 1, wherein said process alternates between a state of maintaining an idle RPM value and activating all firing cylinders in order to efficiently run said internal combustion engine.

10. The process as recited in claim 1, wherein said step of recording an idle RPM value comprises the step of establishing a minimum RPM value for a selected vehicle in which said internal combustion engine is positioned in order to maintain a predetermined idle velocity.

11. In an internal combustion engine system having a plurality of firing cylinders, each having fuel injectors and gas ingress and gas egress valves, a flywheel, a starter motor, and a main bearing, a variable mode engine control process, comprising the steps of:

a. establishing a reference RPM value based on a predetermined vehicle velocity for a vehicle being propelled by said internal combustion engine;

b. based on said RPM reference value, alternating between an idle RPM state and a full activation state in said internal combustion engine by selectively deactivating said fuel injectors and opening said gas valves to reduce backpressure in each cylinder;

c. wherein said full activation state comprises activating all firing cylinders and reconfiguring said gas valves to achieve standard internal combustion engine operation;

d. utilizing a starter motor to selectively engage said main bearing within said idle RPM state to maintain a minimum RPM flywheel value;

e. simultaneously with said step of utilizing a starter motor to selectively engage said main bearing, activating at least one cylinder within said idle RPM state to maintain a minimum RPM flywheel value;

f. wherein said idle RPM and full activations states are determined by an electronic control unit responsive to an accelerator pedal angle sensor input by moving a sensor from a first position to second position for a minimum of 5 seconds responsive to an accelerator pedal angle position.

* * * * *